United States Patent
Chen et al.

(10) Patent No.: US 8,539,261 B2
(45) Date of Patent: Sep. 17, 2013

(54) POWER BOOTING SEQUENCE CONTROL SYSTEM AND CONTROL METHOD THEREOF

(75) Inventors: Shi-Hao Chen, Hsinchu (TW); Youn-Long Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 338 days.

(21) Appl. No.: 12/960,871

(22) Filed: Dec. 6, 2010

(65) Prior Publication Data

US 2012/0072740 A1 Mar. 22, 2012

(30) Foreign Application Priority Data

Sep. 16, 2010 (TW) .............................. 99131378 A

(51) Int. Cl.
*G06F 1/26* (2006.01)
*G06F 1/32* (2006.01)

(52) U.S. Cl.
USPC ........... 713/300; 713/320; 713/321; 713/330; 327/544

(58) Field of Classification Search
USPC ................. 713/300, 320, 321, 330; 327/544
See application file for complete search history.

(56) References Cited

U.S. PATENT DOCUMENTS

2009/0300374 A1* 12/2009 Mori .............................. 713/300

* cited by examiner

*Primary Examiner* — Kim Huynh
*Assistant Examiner* — Michael J Brown
(74) *Attorney, Agent, or Firm* — Harness, Dickey & Pierce, PLC

(57) ABSTRACT

The present invention discloses a power booting sequence control system and the control method thereof, which optimizes a power booting sequence of a plurality of power switches in an integrated circuit. An initial module initializes a target charge value, a preset current budget and a plurality of time intervals. A current lookup module obtains a booting current across a power switch from a built-in current lookup table. A first computing unit and a second computing unit compute a first and a second power switch numbers respectively. A processing module selects the small number of the first and the second power switch number to get a maximum number of power booting switches under the time intervals, and opens the maximum number of the power booting switches. Therefore, the system keeps the in-rush current value under the preset current budget and speeds up the ramp-up time in a power booting state.

20 Claims, 8 Drawing Sheets

POWER BOOTING SEQUENCE CONTROL SYSTEM AND CONTROL METHOD THEREOF

BACKGROUND

1. Technical Field

The present invention relates to a power booting sequence control system and a control method thereof, more specifically to a power booting sequence control system and a control method thereof of each power switch of element blocks in an integrated circuit.

2. Background

The use of power gating to remove the power supply to portions of an integrated circuit is the most effective way to reduce leakage, as a method to further reduce power consumption by inactive circuitry. However, powering up circuitry can have various problems including dynamic IR drop, in-rush current and other problems than can lead to power loss or improper chip operation. Even more seriously, huge in-rush current may also result in on-chip low dropout (LDO) voltage regulators or some IPs can not work well. Therefore, the management of the power booting usually further design an on-chip power gating in the integrated circuit to control the open or close of the power switch of each element block in the integrated circuit.

Moreover, due to a need of low power consumption in many electronic products now, requirements for the power control of the integrated circuit are stricter, that is, the location and the time of each power switch in the controlled circuits are exacter than before. However, the way of power booting at present usually causes the in-rush current value too large and rising speed of the voltage not rapid enough in a state of sequentially turning on the power, and then causes many unexpected problems on the design of the integrated circuit; therefore, the performance of the integrated circuit is affected. Hence, a need of designing an ideal power booting sequence control system in an integrated circuit and a control method thereof is an urgent issue that can be applied to the business.

SUMMARY

In view of the problems in the art above, the object of the present invention is to provide a power booting sequence control system and a control method thereof to solve the problems that the way of power booting at present causes the in-rush current value too large and rising speed of the voltage not rapid enough in a power booting state.

According to the object of the present invention, the present invention provides a power booting sequence control system, being used to optimize a power booting sequence of a plurality of power switches in an integrated circuit. The power booting sequence control system comprises an initial module, a current lookup module, a first computing unit, a second computing unit, and a processing module. The initial module initializes a target charge value, a preset current budget, and a plurality of time intervals. The current lookup module obtains a different voltage value by subtracting an estimate voltage value from a supply voltage value, and obtains a booting current of each the power switch from a built-in current lookup table based on the different voltage value. The first computing unit connects with the initial module, and computes a first power switch number of each the power switch opened in sequence based on the specified timing window file, which determines the exact arrival time for each power switch instance, if it is provided. Wherein, the timing window file is optional. The second computing unit connects with the initial module and the current lookup module, and computes an opened second power switch number based on the booting current in the every time interval if being less than the preset current budget. The processing module connects with the initial module, the current lookup module, the first computing unit, and the second computing unit, and the processing module selects a small number of the first and the second power switch numbers to get a maximum number of the power booting switch in the every time interval if being less than the preset current budget, and opens the maximum number of the power booting switch.

The processing module further computes an accumulated current value, an accumulated charge value, and an accumulated voltage value.

The current lookup module, the first computing unit and the second computing unit produce the renewed booting current, the renewed first power switch number, and the renewed second power switch number respectively if the accumulated charge value is less than the target charge value.

The processing module selects a small number of the renewed first and the renewed second power switch numbers to get a sequential number of power booting switch in the every time interval if being less than the preset current budget, computes the renewed accumulated current value, the renewed accumulated charge value, and the renewed accumulated voltage value, and opens the sequential number of the power booting switch.

If the accumulated charge value is more than or equal to the target charge value, the processing module controls the current lookup module, the first computing unit, and the second computing unit to stop producing the renewed booting current, the renewed first power switch number, and the renewed second power switch number.

According to the object of the present invention, the present invention further provides a method of controlling a power booting sequence, comprising steps of: providing an initial module for initializing a target charge value, a preset current budget, and a plurality of time intervals; providing a current lookup module for obtaining a different voltage value by subtracting an estimate voltage value from a supply voltage value, and obtaining a booting current of each the power switch from a built-in current lookup table; providing a first computing unit for computing a first power switch number of each the power switch opened in sequence based on the every time interval; providing a second computing unit for computing an opened second power switch number based on the booting current in the every time interval if being less than the preset current budget; and providing a processing module for selecting a small number of the first and the second power switch numbers to get a maximum number of power booting switch in the every time interval if being less than the preset current budget, and opening the maximum number of the power booting switch.

The method further comprises a step of computing an accumulated current value, an accumulated charge value, and an accumulated voltage value by the processing module after the processing module obtains the maximum number of the power booting switch in the every time interval.

The method further comprises a step of producing the renewed booting current, the renewed first power switch number, and the renewed second power switch number respectively by the current lookup module, the first computing unit and the second computing unit if the accumulated charge value is less than the target charge value.

The method further comprises a step of selecting a small number of the renewed first and the renewed second power switch numbers by the processing module to get a sequential number of power booting switch in the every time interval if being less than the preset current budget, computing the renewed accumulated current value, the renewed accumulated charge value, and the renewed accumulated voltage value, and opening the sequential number of the power booting switch.

The method the method further comprising a step of controlling the current lookup module, the first computing unit, and the second computing unit by the processing module to stop producing the renewed booting current, the renewed first power switch number, and the renewed second power switch number if the accumulated charge value is more than or equal to the target charge value, According to the object of the present invention, the present invention further provides another power booting sequence control system, being used to optimize a power booting sequence of a plurality of power switches in an integrated circuit. The power booting sequence control system comprises an initial module, a current lookup module, a computing unit, and a processing module. The initial module initializes a target charge value, a preset current budget, and a restriction power switch cluster size. The current lookup module obtains a different voltage value by subtracting an estimate voltage value from a supply voltage value, and obtains a booting current of each the power switch from a built-in current lookup table based on the different voltage value. The computing unit connects with the initial module and the current lookup module, and computes a flexible time interval based on the booting current and the restriction power switch cluster size if being less than the preset current budget. The processing module connects with the initial module, the current lookup module, and the computing unit, and the processing module opens the restriction power switch cluster size and stops opening any of the power switches in the flexible time interval.

The processing module further computes an accumulated current value, an accumulated charge value, and an accumulated voltage value.

The current lookup module and the computing unit produce the renewed booting current and the renewed flexible time interval respectively if the accumulated charge value is less than the target charge value.

The processing module further computes the renewed accumulated current value, the renewed accumulated charge value, and the renewed accumulated voltage value, opens the restriction power switch cluster size, and stops opening any of the power switches in the flexible time interval.

If the accumulated charge value is more than or equal to the target charge value, the processing module controls the current lookup module and the computing unit to stop producing the renewed booting current and the renewed flexible time interval.

According to the object of the present invention, the present invention further provides a method of controlling a power booting sequence, comprising steps of: providing an initial module for initializing a target charge value, a preset current budget, and a restriction power switch cluster size; providing a current lookup module for obtaining a different voltage value by subtracting an estimate voltage value from a supply voltage value, and obtaining a booting current of each the power switch from a built-in current lookup table based on the different voltage value; providing a computing unit for computing a flexible time interval based on the booting current and the restriction power switch cluster size if being less than the preset current budget; and providing a processing module for opening the restriction power switch cluster size and stopping opening any of the power switches in the flexible time interval.

The method further comprising a step of: computing an accumulated current value, an accumulated charge value, and an accumulated voltage value by the processing module after the processing module obtains the flexible time interval.

The method further comprising a step of: producing the renewed booting current and the renewed flexible time interval respectively by the current lookup module and the computing unit if the accumulated charge value is less than the target charge value.

The method further comprising a step of: computing the renewed accumulated current value, the renewed accumulated charge value, and the renewed accumulated voltage value, opening the restriction power switch cluster size, and stopping opening any of the power switches at the flexible time interval by the processing module.

The method further comprising a step of: controlling the current lookup module and the computing unit to stop producing the renewed booting current and the renewed flexible time interval by the processing module if the accumulated charge value is more than or equal to the target charge value In concluding, the power booting sequence control system and a control method thereof of the present invention include one or many advantages below:

(1) Each power switch of the element blocks in the integrated circuit can keep the in-rush current value under the preset current budget in a power booting state.

(2) Each power switch of the element blocks in the integrated circuit can increase the rising speed of the voltage in a power booting state.

DETAILED DESCRIPTION

Please refer to the related drawings below, which illustrate embodiments of a power booting sequence control system and a control method thereof according to the present invention. For easy understanding, the same element will be given the same element number in the following embodiments.

Figure 1:
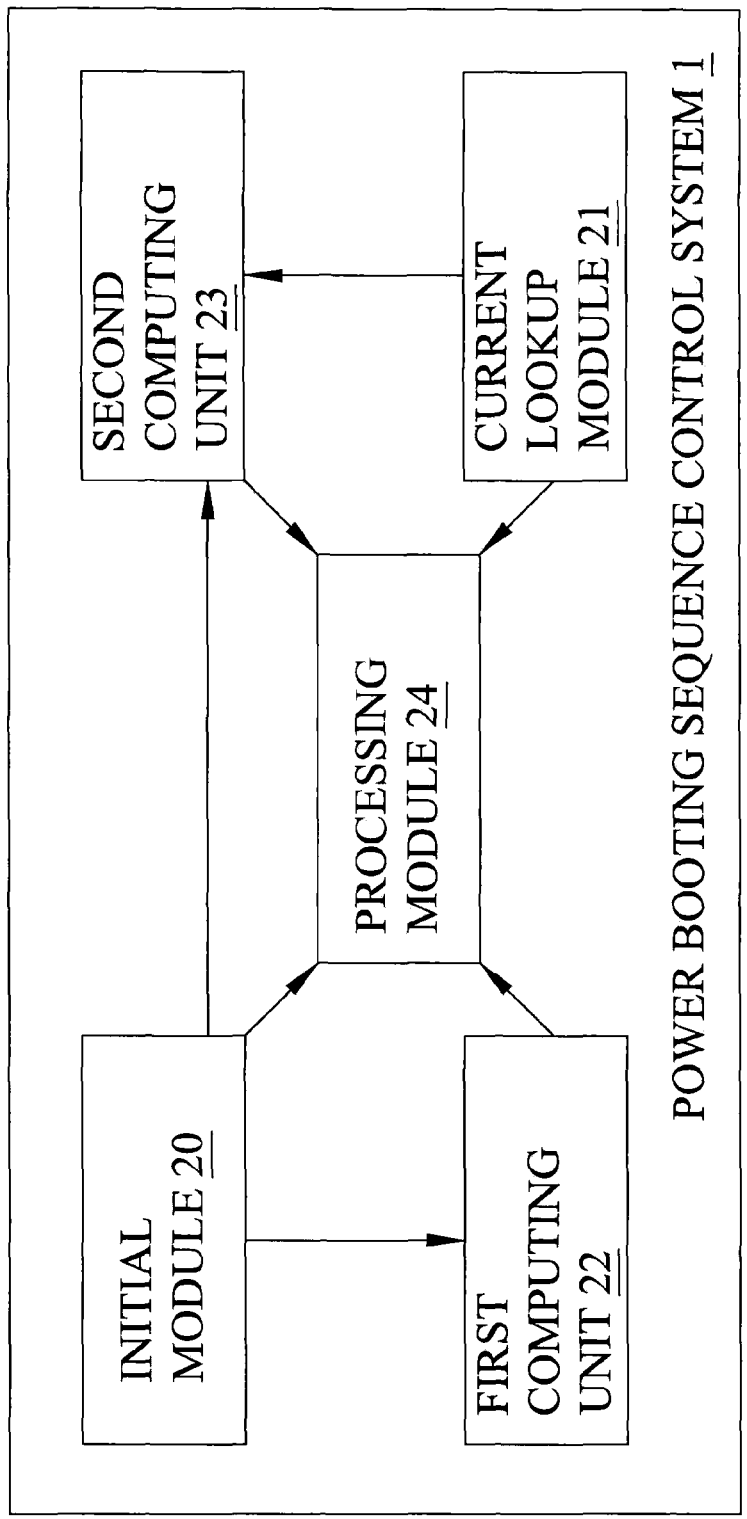
FIG. 1 is a block diagram showing a power booting sequence control system according to first embodiment of the present invention.

Please refer to FIG. 1, which is a block diagram showing a power booting sequence control system according to first embodiment of the present invention. As shown in the drawing, a power booting sequence control system 1 includes an initial module 20, a current lookup module 21, a first computing unit 22, a second computing unit 23, and a processing module 24.

The power booting sequence control system 1 is used to optimize a power booting sequence of a plurality of power switches in an integrated circuit. The initial module 20 initializes a target charge value, a preset current budget, and a fixed time interval. The target charge value is a number that multiplies a supply voltage value by a plurality of capacitance values of element blocks in the integrated circuit, and the preset current budget and time interval can set different value depended on a need of the user. However, the time intervals that set by the user all have equal time length.

Furthermore, the current lookup module 21 obtains a different voltage value by subtracting an estimate voltage value from the supply voltage value, and obtains a booting current of each the power switch from a built-in current lookup table based on the different voltage value. The booting current of each the power switch is the booting current across the p-type or n-type metal oxide semiconductor field effect transistor (MOSFET), wherein the estimate voltage value is an estimate analog voltage value obtained from interpolating the two data built-in the current lookup module 21.

The first computing unit 22 connects with the initial module 20, and computes a first power switch number of each the power switch opened in sequence based on the deterministic timing window file. The timing window file in the embodiment of present invention is optional.

The second computing unit 23 connects with the initial module 20 and the current lookup module 21, and computes an opened second power switch number based on the booting current in each the time interval if being less than the preset current budget.

The processing module 24 connects with the initial module 20, the current lookup module 21, the first computing unit 22, and the second computing unit 23. The processing module 24 selects a small number of the first and the second power switch numbers, and obtains an accumulated current value that multiplies the small number by the booting current, wherein the accumulated current value is less than the preset current budget. In other words, the maximum number of power booting switch in the time interval is obtained. The processing module 24 then computes an accumulated charge value based on the current area and obtains an accumulated voltage value by dividing the obtained accumulated charge value by the plurality of capacitance values of element blocks in the integrated circuit. The processing module 24 then opens the maximum number of the power booting switch in the time interval.

If the accumulated charge value is less than the target charge value, the power booting sequence control system 1 will repeat the motions of every module and unit described above. Hence, the current lookup module 21, the first computing unit 22 and the second computing unit 23 will produce the renewed the booting current, the renewed first power switch number, and the renewed second power switch number respectively based on the foregoing description. The processing module 24 selects a small number of the renewed first and the renewed second power switch numbers, and multiplies the small number by the renewed the booting current. Then the original accumulated current value is added and the renewed accumulated current value is obtained, wherein the renewed accumulated current value is also less than the preset current budget. Therefore, the small number selected from the renewed first and the renewed second power switch numbers by the processing module 24 is the maximum sequential number of the power booting switch. The processing module 24 then computes a renewed accumulated charge value based on the renewed current area, and obtains a renewed accumulated voltage value by dividing the renewed accumulated charge value by the plurality of capacitance values of element blocks in the integrated circuit. After that, the processing module 24 will open maximum sequential number of the power booting switch. Therefore, if the renewed accumulated charge value is less than the target charge value, the power booting sequence control system 1 will repeat the motions described above.

If the renewed accumulated charge value is more than or equal to the target charge value, the current lookup module 21, the first computing unit 22, and the second computing unit 23 will stop producing the renewed booting current, the renewed first power switch number, and the renewed second power switch number. The power booting sequence control system 1 will stop the motions described above.

Figure 2:
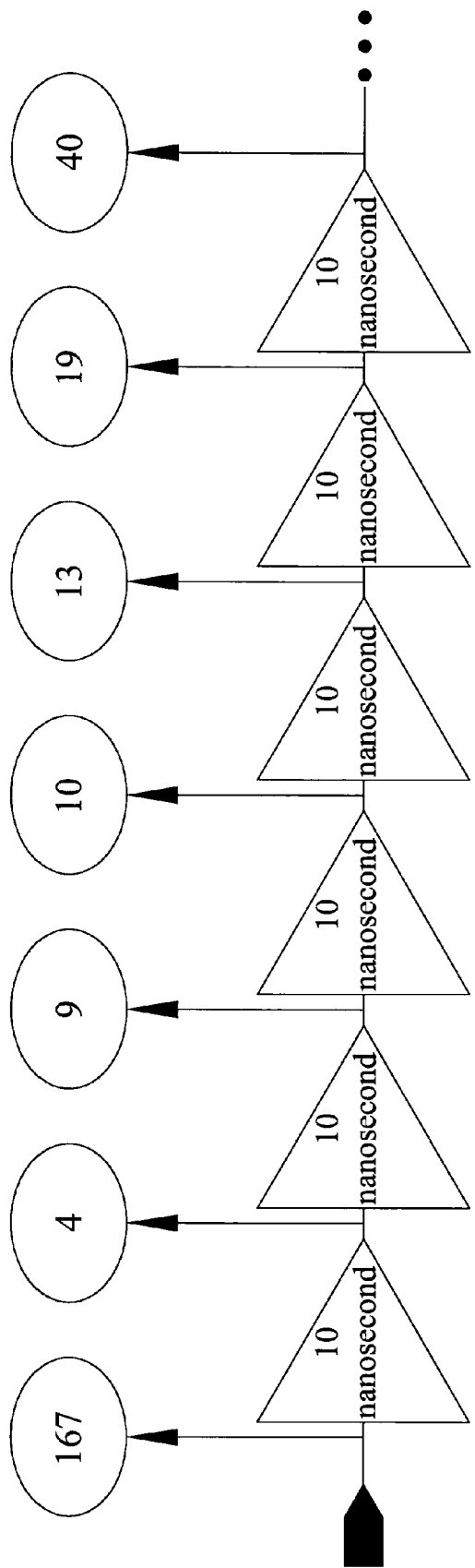
FIG. 2 is a diagram showing a booting sequence of the power booting sequence control system according to the first embodiment of the present invention.

Please refer to FIG. 2, which is a diagram showing the booting sequence of the power booting sequence control system according to the first embodiment of the present invention. As shown in the drawing, the first computing unit 22 and the second computing unit 23 produce the first power switch number and the second power switch number in sequence in the time interval based on the equal time interval that presets 10 nanosecond. The processing module 24 selects small numbers of the first and the second power switch numbers in the time intervals to get maximum number of power booting switch, such as 167, 4, 9, 10, 13, 19, 40 etc., in the time interval of every 10 nanosecond. The processing module 24 then boots the power switches in sequence until the renewed accumulated charge value is more than or equal to the target charge value, and power booting of the element blocks in the integrated circuit is finished.

Figure 3:
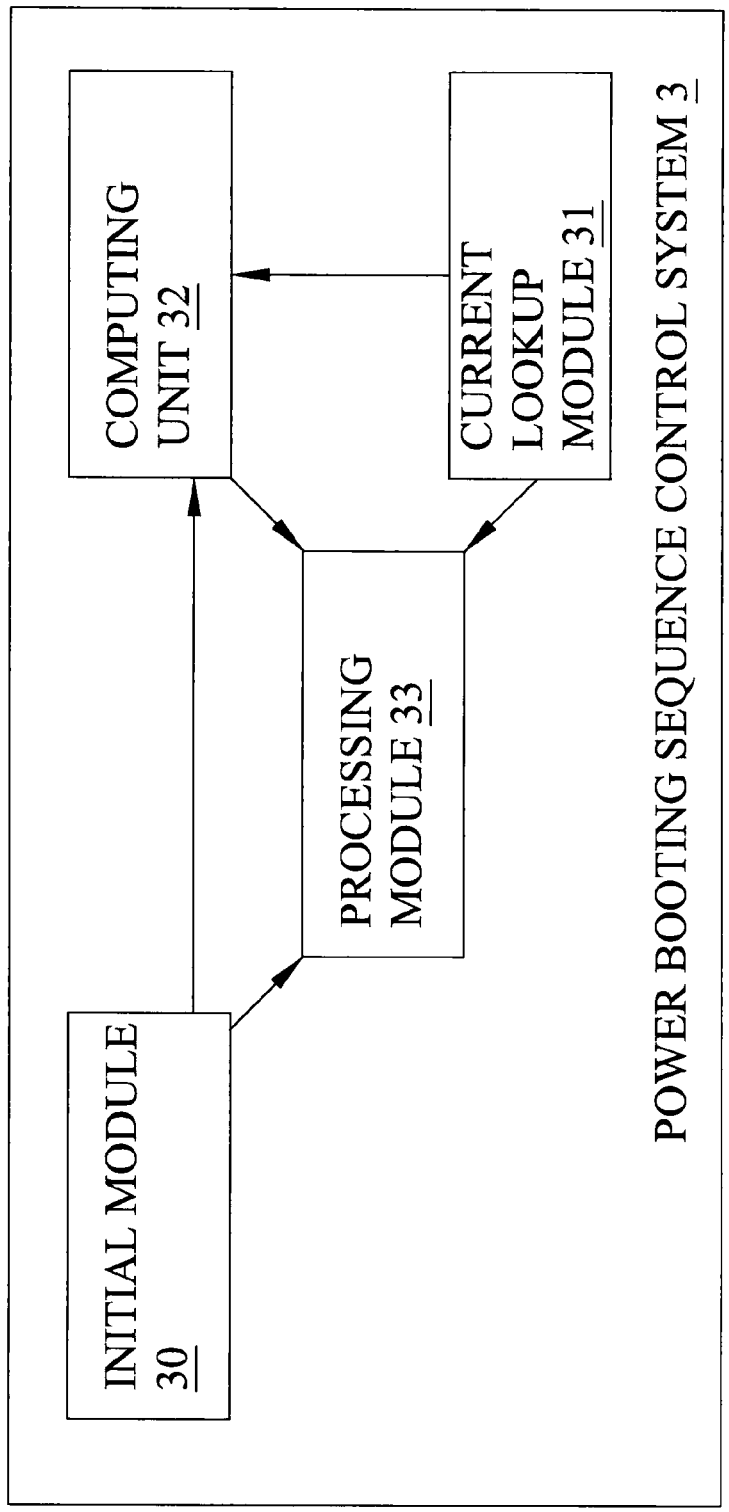
FIG. 3 is a block diagram showing a power booting sequence control system according to second embodiment of the present invention.

Please refer to FIG. 3, which is a block diagram showing the power booting sequence control system according to second embodiment of the present invention. As shown in the drawing, the power booting sequence control system 3 includes an initial module 30, a current lookup module 31, a computing unit 32, and a processing module 33. The power booting sequence control system 3 is used to optimize a power booting sequence of a plurality of power switches in an integrated circuit. It must have to say first that the motions of the second embodiment are the same as the motions of the first embodiment descripted above so that it isn't to give unnecessary details.

The difference between the first and the second embodiments is that: the initial module 30 initializes to set a target charge value, a preset current budget, and a restriction power switch cluster size that the number is fixed. The computing unit 32 computes a flexible time interval based on the booting current and the restriction power switch cluster size if being less than the preset current budget.

The processing module 33 connects with the initial module 30, the current lookup module 31, and the computing unit 32. The processing module 33 opens the restriction power switch cluster size that the number is fixed and stops opening any of the power switches in the flexible time interval. In addition, the processing module 33 computes the accumulated charge value based on the current area and obtains an accumulated voltage value by dividing the obtained the accumulated charge value by the plurality of capacitance values of the element blocks in the integrated circuit.

If the accumulated charge value is less than the target charge value, the power booting sequence control system 3 will repeat the motions of every module and unit described above. Hence, the current lookup module 31 and the computing unit 32 produce the renewed booting current and the flexible time interval respectively. The processing module 33 then computes a renewed accumulated charge value based on a new current area, and obtains a renewed accumulated voltage value by dividing the renewed accumulated charge value by the plurality of capacitance values of the element blocks in the integrated circuit. After that, the processing module 33 opens the restriction power switch cluster size that the number is fixed and stops opening any of the power switches in the flexible time interval. Therefore, if the renewed accumulated charge value is less than the target charge value, the power booting sequence control system 3 will repeat the motions described above.

If the renewed accumulated charge value is more than or equal to the target charge value, the current lookup module 31 and the computing unit 33 will stop producing the renewed booting current and the flexible time interval. The power booting sequence control system 3 will stop the motions described above.

Figure 4:
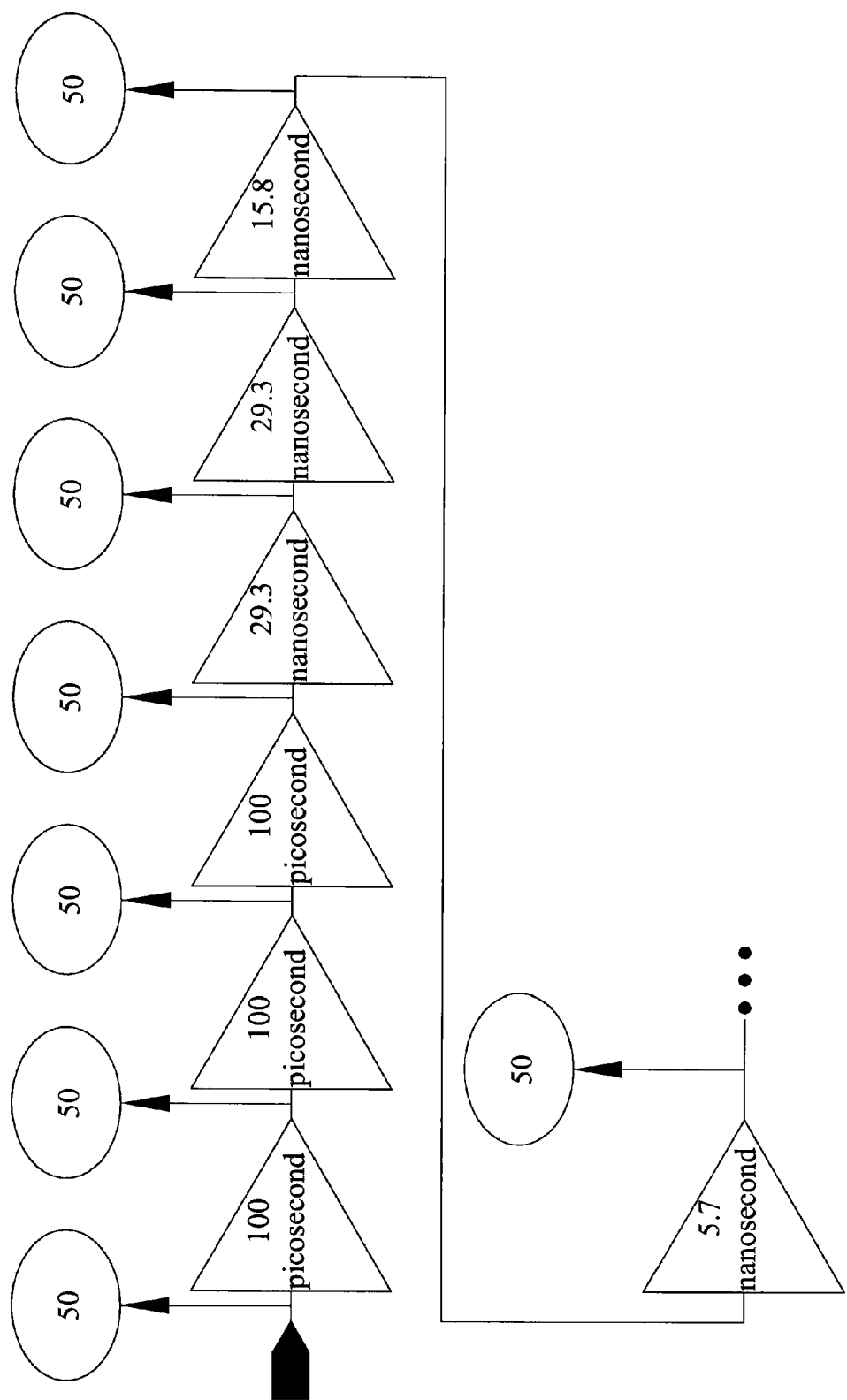
FIG. 4 is a diagram showing booting sequence of the power booting sequence control system according to the second embodiment of the present invention.

Please refer to FIG. 4, which is a diagram showing booting sequence of the power booting sequence control system according to second embodiment of the present invention. As shown in the drawing, the computing unit 32 produces the flexible time interval one by one in sequence based on the fifty power switch cluster that the number is fixed. The processing module 33 then boots the fixed fifty power switches in sequence based on the flexible time interval one by one, such as 100 picoseconds, 100 picoseconds, 100 picoseconds, 29.3 nanosecond, 29.3 nanosecond, and 15.8 nanosecond etc., until the renewed accumulated charge value is more than or equal to the target charge value, and power booting of the element blocks in the integrated circuit is finished.

Figure 5:
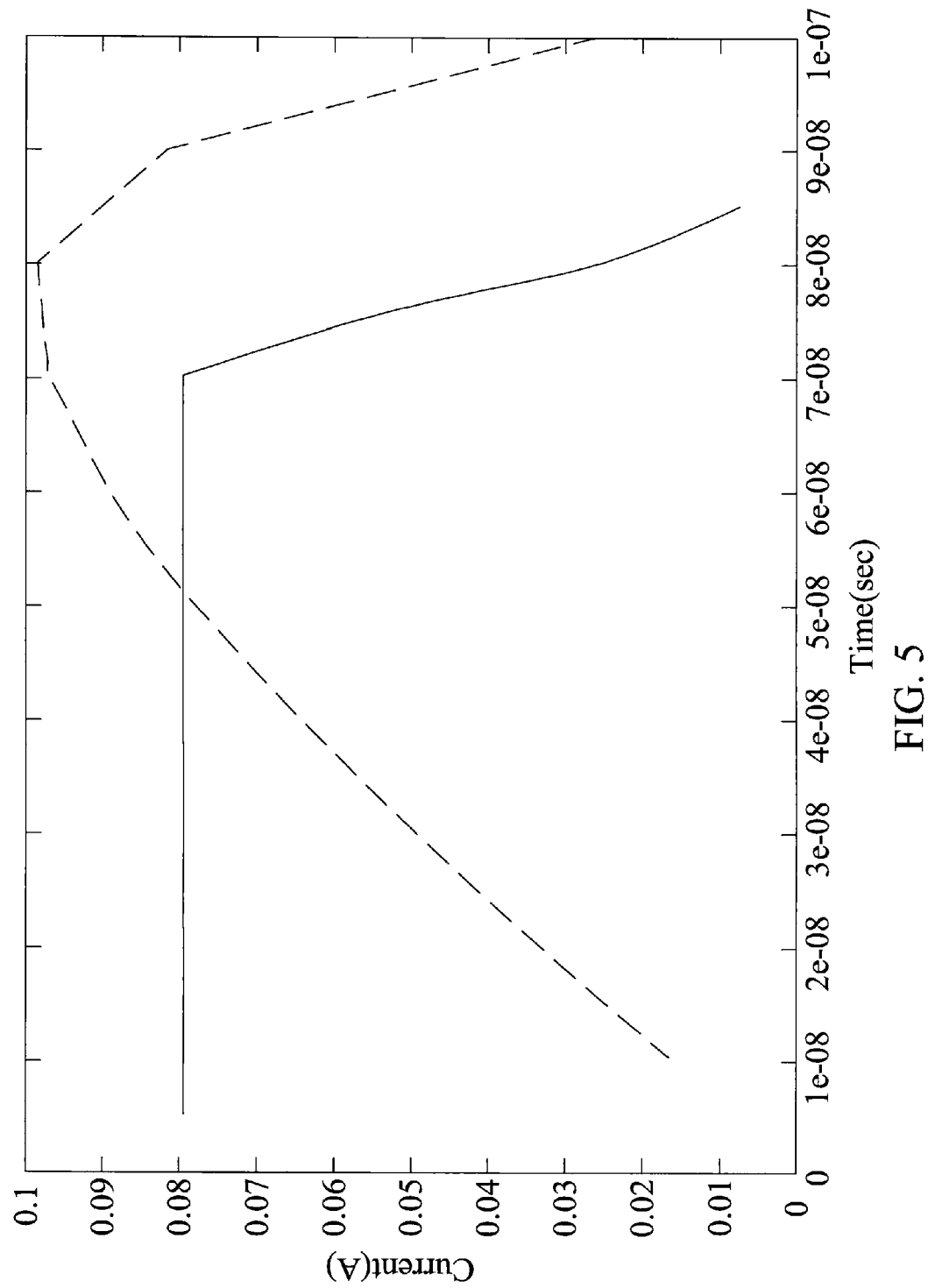
FIG. 5 is schematic diagram showing the accumulated current value of the power booting sequence control system according to two embodiments of the present invention.
Figure 6:
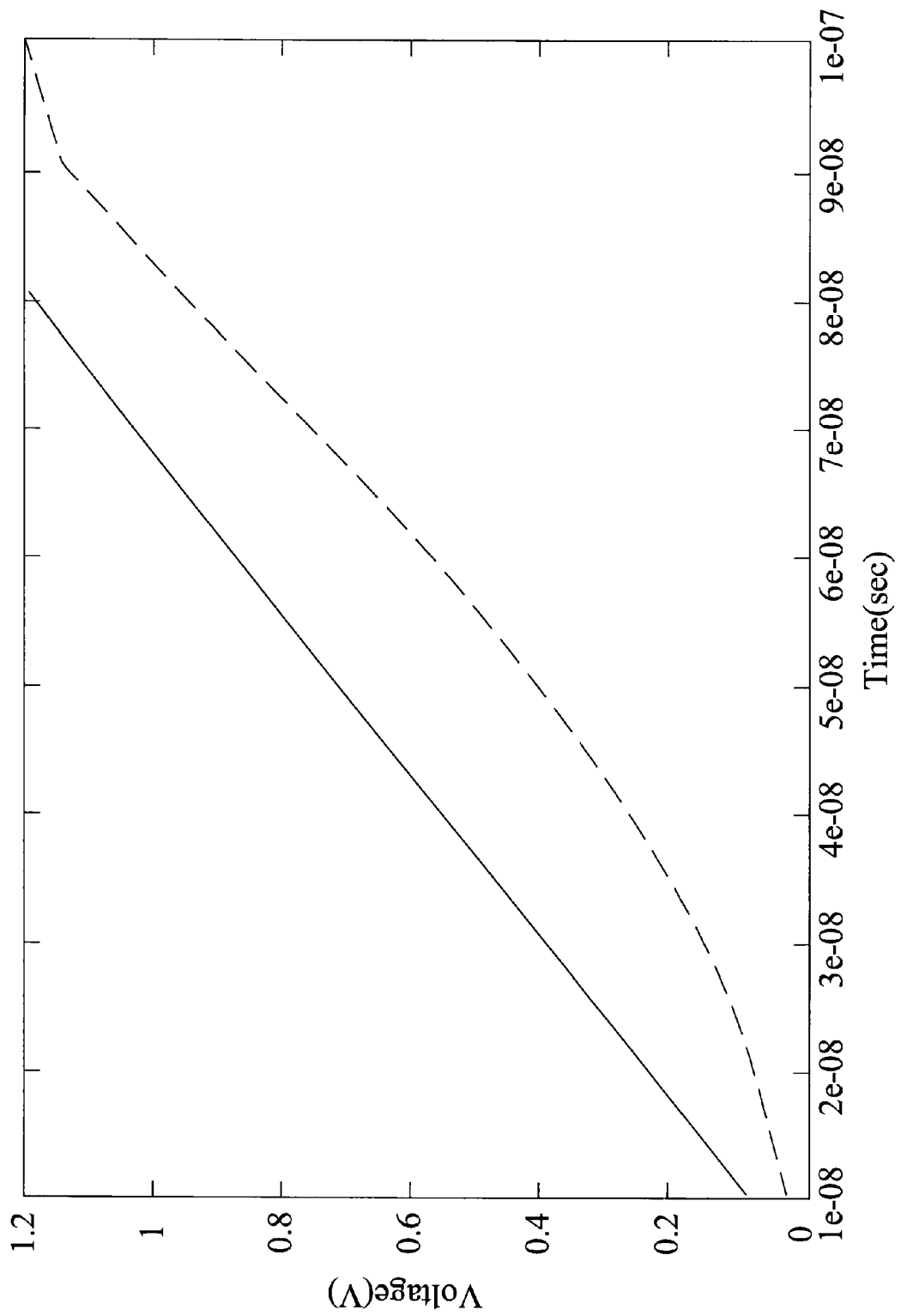
FIG. 6 is schematic diagram showing the accumulated current value of the power booting sequence control system according to two embodiments of the present invention.

Please refer to FIGS. 5 and 6 together, which are schematic diagrams showing the accumulated current value and the accumulated voltage value of the power booting sequence control system according to two embodiments of the present invention.

As shown in FIG. 5, doted line is the accumulated current value produced by the power booting in the conventional integrated circuit, which opens one power switch at one time in sequence. After the accumulated current value increases gradually to a maximum value based on the opening time interval, it will decrease to a low value and the power booting of the element block in the integrated circuit is completed. Solid line is the accumulated current value produced by the power booting sequence control system in the present invention. The accumulated current value is continually kept a preset current budget that is set initially at the start and decreased to a low value after that, and the power booting of the element block in the integrated circuit is completed. From the diagram, we can understand that the in-rush current can be controlled by the power booting sequence control system in the present invention and be kept under a preset current budget.

As shown in FIG. 6, doted line is the accumulated voltage value produced by the power booting in the conventional integrated circuit, and solid line is the accumulated voltage value produced by the power booting sequence control system in the present invention. From the diagram, we can understand that the accumulated voltage value produced by the power booting sequence control system in the present invention can reach to a target value rapider than the accumulated voltage value produced by the power booting in the conventional integrated circuit. In other words, the rising speed of the voltage in the element block of the integrated circuit is increment.

Figure 7:
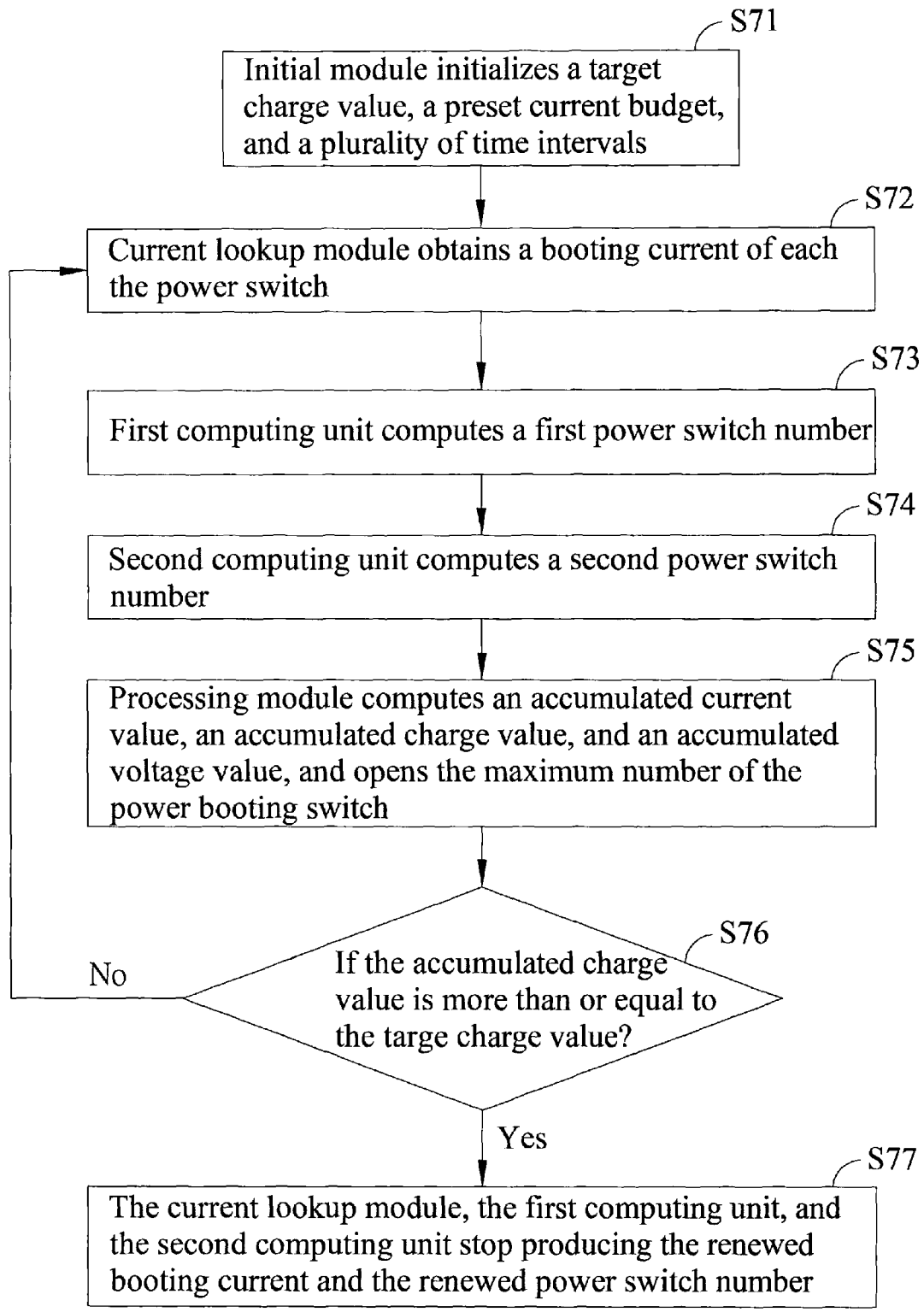
FIG. 7 is a flowchart showing a method of controlling a power booting sequence according to the first embodiment of the present invention.

FIG. 7 is a flowchart showing a method of controlling a power booting sequence according to first embodiment of the present invention. A method of controlling the power booting sequence is used to optimize a power booting sequence of a plurality of power switches in an integrated circuit. Please refer to FIG. 7, firstly as shown in step S71, which provides an initial module for initializing a target charge value, a preset current budget, and a plurality of time intervals. In step S72, which provides a current lookup module for obtaining a different voltage value by subtracting an estimate voltage value from a supply voltage value, and obtains a booting current of each the power switch from a built-in current lookup table. In step S73, which provides a first computing unit for computing a first power switch number of each the power switch opened in sequence based on the deterministic timing window file (optional). In step S74, which provides a second computing unit for computing an opened second power switch number based on the booting current in each fixed time interval if being less than the preset current budget. In step S75, which provides a processing module for selecting a small number of the first and the second power switch numbers to get a maximum number of power booting switch in every the time interval if being less than the preset current budget, computing an accumulated current value, an accumulated charge value, and an accumulated voltage value, and opening the maximum number of the power booting switch.

Then as shown in step S76, the power booting sequence control system must determine that the accumulated charge value and the target charge value which one is bigger. If the accumulated charge value is less than the target charge value, step will return to S72 and repeat the steps. And If the accumulated charge value is more than or equal to the target charge value, go to step S77, which provides the processing module for controlling the current lookup module, the first computing unit, and the second computing unit to stop producing the renewed booting current, the renewed first power switch number, and the renewed second power switch number.

Figure 8:
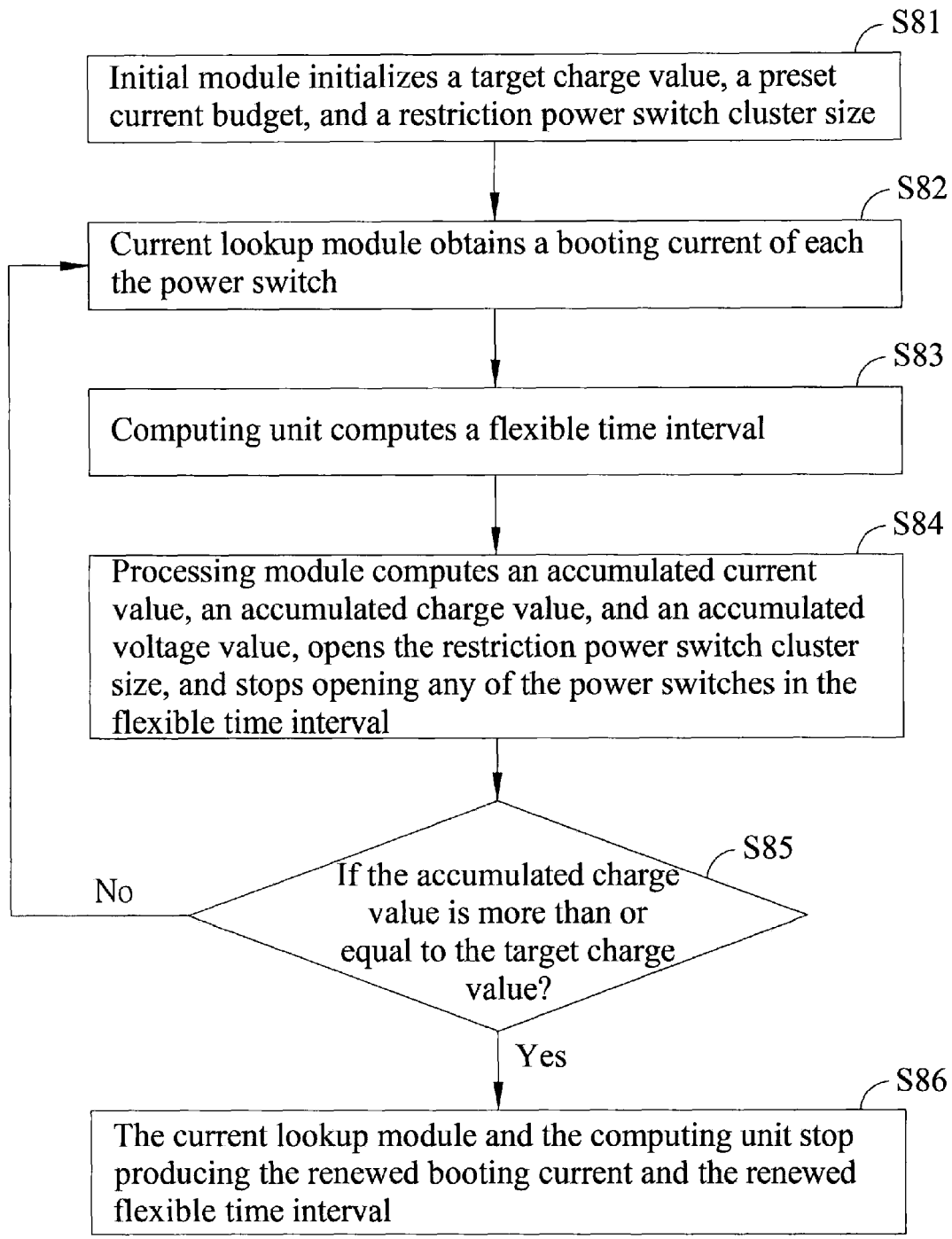
FIG. 8 is a flowchart showing a method of controlling a power booting sequence according to the second embodiment of the present invention.

FIG. 8 is a flowchart showing a method of controlling a power booting sequence according to second embodiment of the present invention. The method of controlling the power booting sequence is used to optimize a power booting sequence of a plurality of power switches in an integrated circuit. Please refer to FIG. 8, firstly as shown in step S81, which provides an initial module for initializing a target charge value, a preset current budget, and a restriction power switch cluster size. In step 82, which provides a current lookup module for obtaining a different voltage value by subtracting an estimate voltage value from a supply voltage value, and obtaining a booting current of each the power switch from a built-in current lookup table based on the different voltage value. In step 83, which provides a computing unit for computing a flexible time interval based on the booting current and the restriction power switch cluster size if being less than the preset current budget. In step 84, which provides a processing module for computing an accumulated current value, an accumulated charge value, and an accumulated voltage value, opening the restriction power switch cluster size, and stopping opening any of the power switches in the flexible time interval.

Then as shown in step S85, the power booting sequence control system must determine that the accumulated charge value and the target charge value which one is bigger. If the accumulated charge value is less than the target charge value, step will return to S82 and repeat the steps. And If the accumulated charge value is more than or equal to the target charge value, go to step S86, which provides the processing module for controlling the current lookup module and the computing unit to stop producing the renewed booting current and the renewed flexible time interval.

Finally, the power booting sequence control system and the control method thereof of the present invention is not limit to the two embodiments. That is to say, the obtained power switch number in fixed time interval in the first embodiment and the flexible time interval obtained from the restriction power switch cluster size that the number is fixed in the second embodiment, they can perform in the power booting sequence control system and the control method thereof in the present invention with each other at the same time. In other words, the embodiments of the present invention is not limited as long as the accumulated current value is less than the preset current budget, and the performance of which is like the description above so that it isn't to give unnecessary details.

In concluding, each power switch of the element blocks in the integrated circuit can keep the in-rush current value under the preset current budget and can increase the rising speed of the voltage in a power booting state by using the power booting sequence control system and the control method thereof.

The foregoing description is only used for example not for restriction. Any equivalent modifications and substitutions which not depart from the spirit and the scope of the present invention should all be included in the claim below.

What is claimed is:

1. A power booting sequence control system, being used to optimize a power booting sequence of a plurality of power switches in an integrated circuit, comprising:

an initial module initializing a target charge value, a preset current budget, and a plurality of time intervals;

a current lookup module obtaining a different voltage value by subtracting an estimate voltage value from a supply voltage value, and obtaining a booting current of each the power switch from a built-in current lookup table based on the different voltage value;

a first computing unit connecting with the initial module, and computing a first power switch number of each the power switch opened in sequence based on the every time interval;

a second computing unit connecting with the initial module and the current lookup module, and computing an opened second power switch number based on the booting current in the every time interval if being less than the preset current budget; and a processing module connecting with the initial module, the current lookup module, the first computing unit, and the second computing unit, wherein the processing module selects a small number of the first and the second power switch numbers to get a maximum number of the power booting switch in the every time interval if being less than the preset current budget, and opens the maximum number of the power booting switch, wherein the processing module further obtains an accumulated current value that multiplies the small number by the booting current, wherein the accumulated current value is less than the preset current budget.

2. The system according to claim 1, wherein the processing module further computes an accumulated charge value, and an accumulated voltage value.

3. The system according to claim 2, wherein the current lookup module, the first computing unit and the second computing unit produce the renewed booting current, the renewed first power switch number, and the renewed second power switch number respectively if the accumulated charge value is less than the target charge value.

4. The system according to claim 3, wherein the processing module selects a small number of the renewed first and the renewed second power switch numbers to get a sequential number of power booting switch in the every time interval if being less than the preset current budget, computes the renewed accumulated current value, the renewed accumulated charge value, and the renewed accumulated voltage value, and opens the sequential number of the power booting switch.

5. The system according to claim 4, wherein if the accumulated charge value is more than or equal to the target charge value, the processing module controls the current lookup module, the first computing unit, and the second computing unit to stop producing the renewed booting current, the renewed first power switch number, and the renewed second power switch number.

6. A method of controlling a power booting sequence, being used to optimize a power booting sequence of a plurality of power switches in an integrated circuit, comprising steps of:

providing an initial module for initializing a target charge value, a preset current budget, and a plurality of time intervals;

providing a current lookup module for obtaining a different voltage value by subtracting an estimate voltage value from a supply voltage value, and obtaining a booting current of each the power switch from a built-in current lookup table;

providing a first computing unit for computing a first power switch number of each the power switch opened in sequence based on the every time interval;

providing a second computing unit for computing an opened second power switch number based on the booting current in the every time interval if being less than the preset current budget; and providing a processing module for selecting a small number of the first and the second power switch numbers to get a maximum number of power booting switch in the every time interval if being less than the preset current budget, and opening the maximum number of the power booting switch, wherein the processing module further obtains an accumulated current value that multiplies the small number by the booting current, wherein the accumulated current value is less than the preset current budget.

7. The method of controlling a power booting sequence according to claim 6, wherein after the processing module obtains the maximum number of the power booting switch in the every time interval, the method further comprising a step of:

computing an accumulated charge value, and an accumulated voltage value by the processing module.

8. The method of controlling a power booting sequence according to claim 7, wherein if the accumulated charge value is less than the target charge value, the method further comprising a step of:

producing the renewed booting current, the renewed first power switch number, and the renewed second power switch number respectively by the current lookup module, the first computing unit and the second computing unit.

9. The method of controlling a power booting sequence according to claim 8, further comprising a step of:

selecting a small number of the renewed first and the renewed second power switch numbers by the processing module to get a sequential number of power booting switch in the every time interval if being less than the preset current budget, computing the renewed accumulated current value, the renewed accumulated charge value, and the renewed accumulated voltage value, and opening the sequential number of the power booting switch.

10. The method of controlling a power booting sequence according to claim 9, wherein if the accumulated charge value is more than or equal to the target charge value, the method further comprising a step of:
controlling the current lookup module, the first computing unit, and the second computing unit by the processing module to stop producing the renewed booting current, the renewed first power switch number, and the renewed second power switch number.

11. A power booting sequence control system, being used to optimize a power booting sequence of a plurality of power switches in an integrated circuit, comprising:
an initial module initializing a target charge value, a preset current budget, and a restriction power switch cluster size;
a current lookup module obtaining a different voltage value by subtracting an estimate voltage value from a supply voltage value, and obtaining a booting current of each the power switch from a built-in current lookup table based on the different voltage value;
a computing unit connecting with the initial module and the current lookup module, and computing a flexible time interval based on the booting current and the restriction power switch cluster size if being less than the preset current budget; and
a processing module connecting with the initial module, the current lookup module, and the computing unit, the processing module opening the restriction power switch cluster size and stopping opening any of the power switches in the flexible time interval, wherein the processing module further obtains an accumulated current value that multiplies the restriction power switch cluster size by the booting current, wherein the accumulated current value is less than the preset current budget.

12. The system according to claim 11, wherein the processing module further computes an accumulated charge value, and an accumulated voltage value.

13. The system according to claim 12, wherein the current lookup module and the computing unit produce the renewed booting current and the renewed sequential time interval respectively if the accumulated charge value is less than the target charge value.

14. The system according to claim 13, wherein the processing module further computes the renewed accumulated current value, the renewed accumulated charge value, and the renewed accumulated voltage value, opens the restriction power switch cluster size, and stops opening any of the power switches in the flexible time interval.

15. The system according to claim 14, wherein if the accumulated charge value is more than or equal to the target charge value, the processing module controls the current lookup module and the computing unit to stop producing the renewed booting current and the renewed flexible time interval.

16. A method of controlling a power booting sequence, being used to optimize a power booting sequence of a plurality of power switches in an integrated circuit, comprising steps of:
providing an initial module for initializing a target charge value, a preset current budget, and a restriction power switch cluster size;
providing a current lookup module for obtaining a different voltage value by subtracting an estimate voltage value from a supply voltage value, and obtaining a booting current of each the power switch from a built-in current lookup table based on the different voltage value;
providing a computing unit for computing a flexible time interval based on the booting current and the restriction power switch cluster size if being less than the preset current budget; and
providing a processing module for opening the restriction power switch cluster size and stopping opening any of the power switches in the flexible time interval, wherein the processing module further obtains an accumulated current value that multiplies the restriction power switch cluster size by the booting current, wherein the accumulated current value is less than the preset current budget.

17. The method of controlling a power booting sequence according to claim 16, wherein after the processing module obtains the flexible time interval, the method further comprising a step of:
computing an accumulated charge value, and an accumulated voltage value by the processing module.

18. The method of controlling a power booting sequence according to claim 17, wherein if the accumulated charge value is less than the target charge value, the method further comprising a step of:
producing the renewed booting current and the renewed flexible time interval respectively by the current lookup module and the computing unit.

19. The method of controlling a power booting sequence according to claim 18, wherein the method further comprising a step of:
computing the renewed accumulated current value, the renewed accumulated charge value, and the renewed accumulated voltage value, opening the restriction power switch cluster size, and stopping opening any of the power switches in the flexible time interval by the processing module.

20. The method of controlling a power booting sequence according to claim 19, wherein if the accumulated charge value is more than or equal to the target charge value, the method further comprising a step of:
controlling the current lookup module and the computing unit to stop producing the renewed booting current and the renewed flexible time interval by the processing module.

* * * * *